(12) United States Patent
Minkoff

(10) Patent No.: US 6,434,235 B1
(45) Date of Patent: Aug. 13, 2002

(54) ACOUSTIC ECHO CANCELER

(75) Inventor: John Minkoff, Engewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/630,170

(22) Filed: Aug. 1, 2000

(51) Int. Cl.[7] .............................................. H04M 9/08
(52) U.S. Cl. ......................... 379/406.08; 379/406.06; 379/406.01; 379/406.02; 379/406.03; 379/406.09; 379/406.11
(58) Field of Search ................. 379/406–410, 379/416

(56) References Cited

U.S. PATENT DOCUMENTS

| | | | |
|---|---|---|---|
| 4,712,235 A | * 12/1987 | Jones, Jr. | 379/406.08 |
| 5,610,909 A | 3/1997 | Shaw | 370/291 |
| 5,631,899 A | 5/1997 | Duttweiler | 370/291 |
| 5,663,955 A | 9/1997 | Iyengar | 370/291 |
| 5,764,512 A | 6/1998 | Michel et al. | 364/400.01 |
| 5,828,756 A | 10/1998 | Benesty et al. | 381/66 |
| 5,838,786 A | 11/1998 | Brown et al. | 379/407 |
| 5,926,405 A | 7/1999 | Minkoff | 364/724.19 |
| 6,081,732 A | * 6/2000 | Suvanen et al. | 455/570 |

* cited by examiner

Primary Examiner—Forester W. Isen
Assistant Examiner—Ramnandan Singh
(74) Attorney, Agent, or Firm—Duane, Morris & Heckscher, LLP

(57) ABSTRACT

A telephone system including a base station and a mobile unit in communication with each other is provided with an acoustic echo canceler. A sound signal is input. A reference signal that matches the sound signal is formed. A plurality of encoders and decoders receive the reference signal and form a modified reference signal. The plurality of encoders and decoders match a set of encoders and decoders that operate on the sound signal in the base station and the mobile unit. An adaptive filter receives the modified reference signal and forms a replica signal. A subtractor subtracts the replica signal from an echo signal received by the base station.

20 Claims, 2 Drawing Sheets

ACOUSTIC ECHO CANCELER

FIELD OF THE INVENTION

The present invention relates to the field of echo cancelers generally, and more specifically to acoustic echo cancelers

DESCRIPTION OF THE RELATED ART

A call to a wireless mobile telephone passes through a base station with which the mobile unit is in contact. The speech signals transmitted from the base station of the wireless system may be transmitted from the earpiece or loudspeaker of the mobile unit to the mouthpiece or microphone of the mobile unit. This coupling may result from direct propagation of the sound through the air and/or coupling of the sound through the material of the mobile unit (i.e., the handset) itself. The transmitted mobile signal arrives back at the base station with an amplitude and a time delay that are functions of the medium in which the sound wave propagates, such as the speed of sound, and the distance of the propagation path.

Back at the base station, the acoustically coupled or directly propagated sound adds with the speech from the mobile unit. The coupled sound may have a small effect if the delay time is very short. A long delay produces a distracting, distinct repetition of the caller to the mobile's original speech (an echo). Whether the delay is long or short, the echo produced by such coupling is undesirable.

Echo cancelers are known for use in systems that are prone to echoes, and operate by anticipating the echo that a signal will produce and subtracting the anticipated echo from the signal. The main elements of an echo canceler include an adaptive filter and a subtracter. The adaptive filter correlates a reference signal (presumably a duplicate of the caller's voice signal) with the voice signal returning along the echo path. Over a short period of time, numerical factors are developed that model the echo path. The factors define the impulse response of the echo transmission pathway, which embodies aspects of attenuation and time delay. The reference signal is then multiplied by the impulse response as represented by the factors, producing an echo replica signal that is subtracted from the actual echo signal received along the echo path.

The difference or error is fed back to the adaptive filter. The adaptive filter adjusts its coefficients (or taps) as necessary to minimize the error. The coefficients are initially calculated over a short period at the beginning of a call, and thereafter are refined. Normally, reasonably accurate coefficients are reached promptly. The echo path is typically due to the character and fixed geometry of the signal transmission path. Normally the signal path does not change, and after the coefficients are reached they do not change substantially for the duration of a connection. However it is possible that the transmission path could change (for example, in the case of a hands-free speaker phone in an enclosure with doors or windows that can be opened). It is not possible to predict the echo response, and for these reasons, the echo canceler continuously updates or revises the coefficients, and adaptively cancels the echo by adjusting the coefficients.

FIG. 1, labeled prior art, shows a typical arrangement in the form of a cordless telephone system 9 that has a base station 9a and a mobile unit 9b. A sound signal 20 is transmitted from base unit 9a via antenna 21, shown as wireless signal 22, to a receiving antenna 23 of mobile unit 9b. The signal typically contains a voice signal. There is a coupling path 24, for example due to acoustic coupling between the speaker and microphone of the mobile unit 9b. Mobile unit 9b transmits the echo signal as a wireless signal 26, from antenna 25 of the mobile unit 9b to antenna 27 of the base station 9a. The reference signal 20' (which is a duplicate of the original sound signal 20) and the returning signal 28 are fed to the adaptive filter 29, which outputs a replica signal 29a. The received replica signal 29a is subtracted from the echo signal 28 in subtractor 30, to form a feedback signal 31 that is fed back to the adaptive filter 29.

The echo canceler in the device shown in FIG. 1 is associated with the device that produces the echo. Therefore, the device operates substantially for the benefit of the remote correspondent by eliminating the echo produced locally at the mobile unit.

In a simple theoretical arrangement wherein there is a linear relationship between the reference signal and the echo, the returning echo signal might be characterized as a delayed copy of the sound signal and the reference signal, having an amplitude that is proportionately reduced relative to the reference signal. In that case the impulse response of the echo path simply represents a delay. If there are no non-linear operations performed on the sound signal, it is possible to delay the reference signal in the adaptive filter, so as to have the same phase as the echo. The echo response, however, may be more complicated than that.

In a typical cordless telephone system, signals are compressed (encoded) from samples at 64 kilobits per second to eight kilobits per second before being transmitted between the base station and the mobile unit. The compressed data is decompressed (decoded) by the recipient. FIG. 2 shows the effect of adding encoding and decoding stages into the signal processing path. In FIG. 2, a prior art cordless telephone system 10 includes a base station 10a and a mobile unit 10b. A sound signal 40 is encoded at encoder 41. The encoded signal 42 is transmitted from base unit 10a via antenna 43, as wireless signal 44, to a receiving antenna 45 of mobile unit 10b. The signal is decoded in decoder 46 and provided to a speaker (not shown). There is an acoustic coupling 47 between the speaker and microphone (not shown) of the mobile unit 10b, providing an echo transmission path. The input to the microphone is encoded in encoder 48. Mobile unit 10b transmits the encoded signal 49 as a wireless signal 51, from antenna 50 of the mobile unit 10b to antenna 52 of the base station 10a. The signal is decoded at decoder 53 of the base station 10a. The reference signal 40' (which is a duplicate of the original sound signal 40) is also fed to the adaptive filter 55, which outputs a replica signal 55a. The received replica signal 55a is subtracted from the echo signal 54 in subtractor 56, to form a feedback signal 58 that is fed back to the adaptive filter 55.

The encoders 41, 48 and decoders 46, 53 perform non-linear operations. The coupled earpiece output is added prior to the second non-linear encoding operation and the second non-linear decoding operation. The speech signals 44 transmitted from the base station to the mobile unit undergo a round of encoding and decoding on the downlink, and the acoustic echo in the mobile unit 10b undergoes a second round of encoding and decoding in transmission over the uplink. The acoustic echo in the sound signal 51 transmitted to the base station is thus subjected to a non-linear transformation with respect to the reference signal 40'. In short, there is no precise delay time associated with the echo transmission path, as is characteristic of a simple acoustic echo transmission path. Standard echo-cancellation techniques, which assume a linear, coherent relationship between the reference signal and the echo, at least at a particular frequency, are not effective.

An improved echo canceler is desired to accommodate this complication.

SUMMARY OF THE INVENTION

The present invention is a method and apparatus for echo cancellation in a system having first and second units in communication with each other, the method including a plurality of encoding and decoding operations performed on a reference signal to form a modified reference signal, the plurality of encoding and decoding operations matching a set of encoding and decoding operations performed on a sound signal by the first unit and the second unit.

In a method according to the invention, a reference signal matches a sound signal. A plurality of encoding and decoding operations are performed on a reference signal to form a modified reference signal. The plurality of encoding and decoding operations match a set of encoding and decoding operations performed on the sound signal by the first unit and the second unit. The modified reference signal is applied to an adaptive filter to form a replica signal. The replica signal is subtracted from an echo signal received by the first unit.

Another aspect of the invention is an acoustic echo canceler for a system having a first unit and a second unit in communication with each other for transmitting a sound signal. A plurality of encoders and decoders receive a reference signal that matches the sound signal, and form a modified reference signal. The plurality of encoders and decoders match a set of encoders and decoders that operate on the sound signal in the first unit and the second unit. An adaptive filter receives the modified reference signal and forms a replica signal. A subtractor subtracts the replica signal from an echo signal received by the first unit.

DETAILED DESCRIPTION

The present invention is a method and device for canceling an acoustic echo in a system having a first unit and a second unit in communication with each other. The invention improves upon echo cancellation effectiveness in a system which may have a nonlinear relationship between the reference signal and the echo signal. In such a system, delaying the reference signal (or the impulse response correction signal, etc.) by a given echo path delay, does not ensure that the echo cancellation signal will align in phase with the signal returning along the echo transmission path. The adaptive filter is not able to effectively cancel out the echo.

According to the invention, the same known, deterministic operations to which the echo signal is subjected along the echo transmission path, such as successive nonlinear encoding and decoding operations, are applied to the reference signal to form a modified reference signal. The modified reference signal, having undergone the same transformations as the echo signal, is coherent with the returning echo signal, even though the transformations that occur may be non-linear. Thus, the modified reference signal is generated and used as an input to the adaptive filter for correlation with the returning signal from the echo path, making the echo cancellation more effective, using known echo cancellation techniques and devices, than would be possible using the original reference signal as an input to the adaptive filter.

Figure 1:
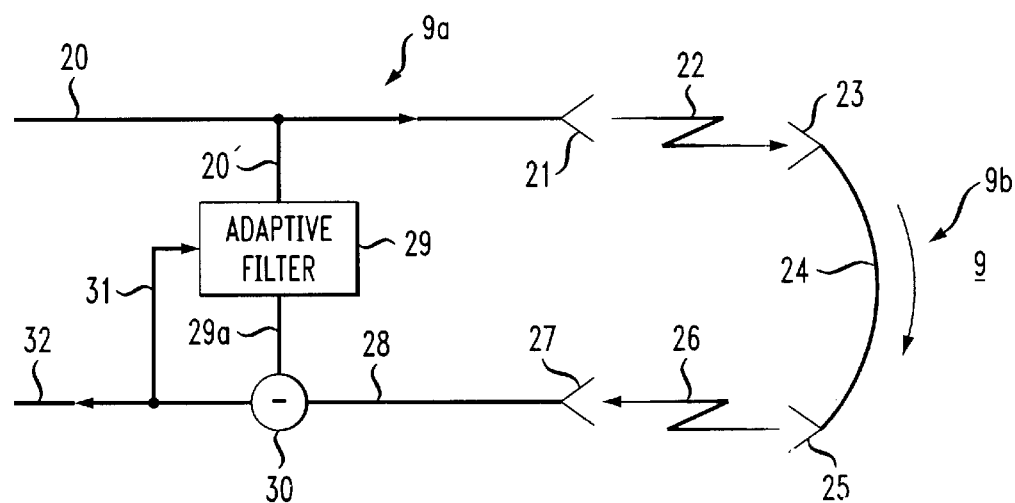
FIG. 1 is a block diagram of a cordless telephone system having an echo canceler, without compression.
Figure 2:
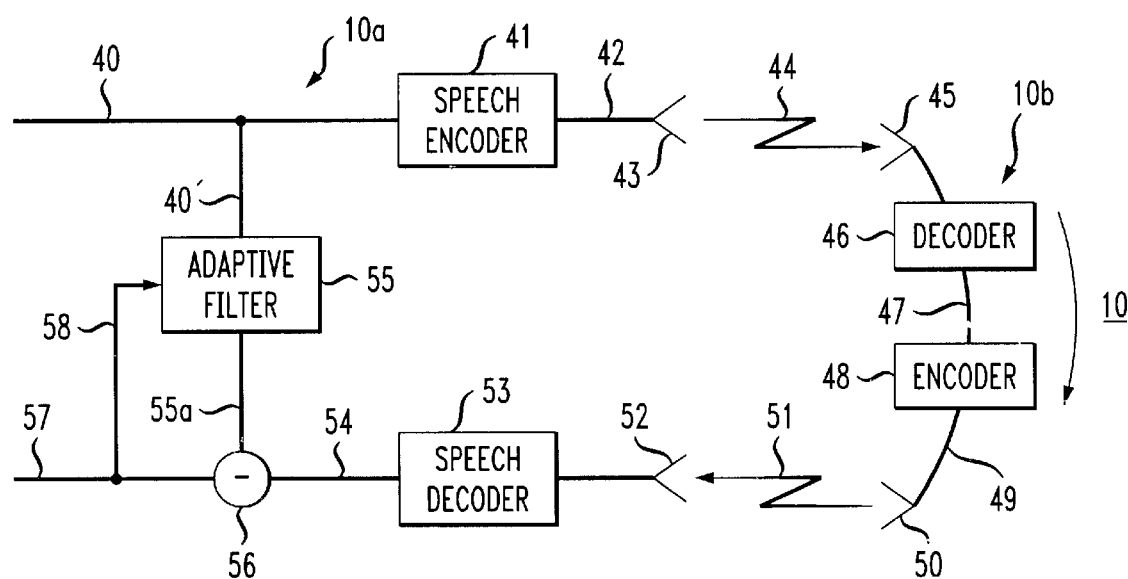
FIG. 2 is a block diagram of a cordless telephone system having an echo canceler, with compression.
Figure 3:
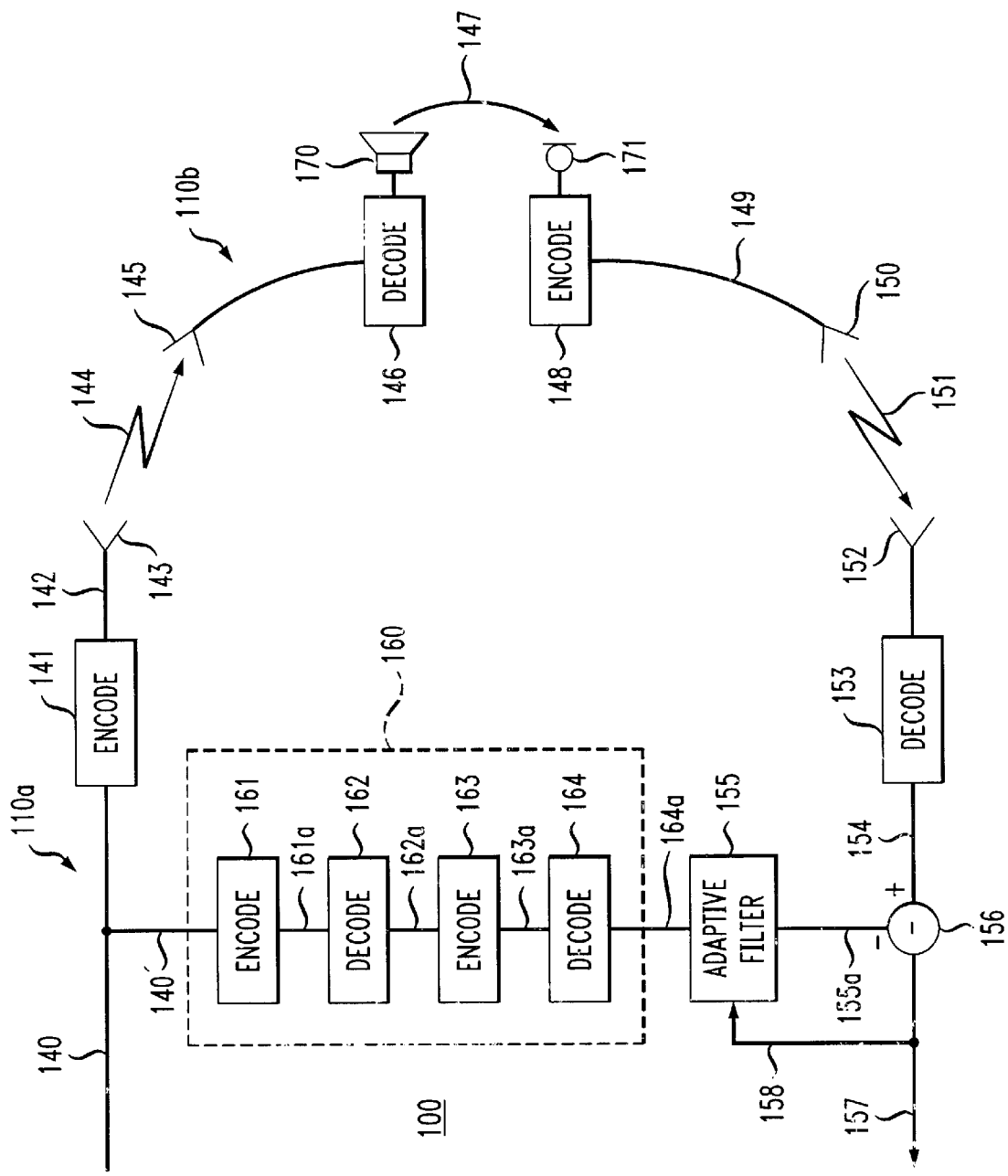
FIG. 3 is a block diagram of an exemplary cordless telephone system according to the present invention.

FIG. 3 shows a method for echo cancellation and an echo cancellation apparatus according to the present invention. The system of FIG. 3 is a communications system 100 including a first unit 110a and a second unit 110b in communication with each other.

The nature of the communications link is such that data in the sound signal 140 are encoded before transmission between the first and second units 110a and 110b, and decoded upon receipt. For example, the encoding may include the application of a compression algorithm to the data, and/or the application of an encryption algorithm. Similarly, the decoding may include the application of a decompression algorithm and/or a decryption algorithm to the data.

An example of such a system may include a cordless telephone in which data are compressed before transmission from the first unit (base station 110a) to the second unit (handset or mobile unit 110b). Another example may be a pair of secure telephone units employing encryption. Still another example may be a cellular telephone system, in which compression or encryption is performed before transmissions between the antenna of the land line components and the mobile cellular telephone, and the received data are decompressed or decrypted. Other uses for the echo canceler will be recognized by those of ordinary skill in the art. In the exemplary embodiment, the first unit (base station 110a) receives a sound signal 140, for example speech from a microphone (not shown) in the base station. A reference signal 140' matches the sound signal 140. The sound signal 140 is encoded in encoder 141, and the encoded sound signal 144 is transmitted to the mobile unit 110b by way of antenna 143, the wireless medium and the antenna 145. The base unit 110a also receives signals from the mobile unit 110b via antenna 150, the wireless medium, and antenna 152. The received signal is decoded in decoder 153.

The second unit (mobile unit 110b) receives the encoded sound signal 144 via antenna 145 and decodes the signal in decoder 146, for transmission to speaker or earpiece 170. The mobile unit 110b also has a microphone 171, by which speech or other sound is fed to encoder 148. The encoded sound 149 is transmitted via antenna 150 back to the base station 110a. The speaker 170 and microphone 171 of the second unit 110b are acoustically coupled, so that the echo signal 154 received by the first unit 110a includes a portion 147 of the decoded sound signal, as indicated by coupling 147.

According to one aspect of the invention, prior to applying the reference signal 140' to the adaptive filter 155, a plurality of encoding and decoding operations are performed on the reference signal 140' in a signal processing block 160, to form a modified reference signal 164a. The plurality of encoding and decoding operations match a set of encoding and decoding operations performed on the sound signal 140 by the first unit 110a and the second unit 110b. Because it is contemplated that non-linear encoding operations are likely to be used, the encoding and decoding functions in the echo canceler are performed in the same order as in the elements of the telephone system.

The modified reference signal 164a is applied to an adaptive filter 155 to form a replica signal 155a. The replica signal 155a is subtracted from an echo signal 154 received by the first unit 110a.

Block 160 includes means for performing a plurality of encoding and decoding operations on the reference signal 140' to form a modified reference signal 164*a*. The exemplary block 160 includes a first encoder 161, a first decoder 162, a second encoder 163 and a second decoder 164.

The first encoder 161 performs a first non-linear encoding operation on the reference signal 140' that matches an encoding operation performed on the sound signal 140 by encoder 141 in the first unit 110*a*, to form a first signal 161*a*.

The first decoder 162 performs a first non-linear decoding operation on the first signal 161*a* that matches a decoding operation performed on the encoded sound signal 144 by decoder 146 in the second unit 110*b*, to form a second signal 162*a*.

The second encoder 163 performs a second non-linear encoding operation on the second signal 162*a* that matches an encoding operation performed on the sound and echo signals by encoder 148 in the second unit 110*b*, to form a third signal 163*a*; and The second decoder 164 performs a second non-linear decoding operation on the third signal 163*a* that matches a decoding operation performed on the encoded sound and echo signal 151 by decoder 153 in the first unit 110*a*, to form the modified reference signal 164*a*.

Thus, the set of encoding and decoding operations performed on the reference signal 140' in block 160 matches the encoding and decoding operations performed on the sound signal 140 in both the first unit 110*a* and the second unit 110*b*. These operations include, in order: a first encoding operation performed in the first unit 110*a*, a first decoding operation performed in the second unit 110*b*, a second encoding operation performed in the second unit 110*b*, and a second decoding operation performed in the first unit 110*a*.

The modified reference signal 164*a* is applied to adaptive filter means, such as the adaptive filter 155. The adaptive filter 155 may be, for example, a finite impulse response (FIR) filter having filter coefficients that are adaptively updated to model the transfer characteristic of the echo signal 154 at sample intervals. Adaptive filter 155 forms a replica signal 155*a* as an estimate of the undesired echo signal. Adaptive filters of the types used in echo cancelers of the prior art are suitable for this purpose. For example, an adaptive filter suitable for use in a line echo canceler (used to correct impedance mismatches which occur when two-wire local customer loops are coupled to four-wire long-distance trunks) may be used.

The adaptive filter 155 provides the replica signal 155*a* to a subtraction means, such as the subtractor 156. The subtractor 156 subtracts the replica signal 155*a* from the echo signal 154. The result of the subtracting is a difference signal 158. The difference signal 158 is fed back to the adaptive filter 155.

Although the exemplary embodiment includes a mobile telephone system in which two sets of encoding and decoding operations are performed, the invention may be applied to telephone systems having different numbers of encoding and decoding operations.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for canceling an acoustic echo in a system having a first unit and a second unit in communication with each other, comprising the steps of:

(a) performing a plurality of encoding and decoding operations on a reference signal that is identical or similar to a sound signal, to form a modified reference signal, the plurality of encoding and decoding operations being identical or similar to a set of encoding and decoding operations performed on the sound signal by the first and second units to form an echo signal;

(b) applying the modified reference signal to an adaptive filter to form a replica signal; and (c) subtracting the replica signal from the echo signal.

2. The method of claim 1, wherein the plurality of encoding and decoding operations include first and second encoding operations and first and second decoding operations.

3. The method of claim 1, wherein the set of encoding and decoding operations include, in order: a first encoding operation performed in the first unit, a first decoding operation performed in the second unit, a second encoding operation performed in the second unit, and a second decoding operation performed in the first unit.

4. The method of claim 1, wherein the set of encoding and decoding operations includes:

encoding the sound signal in the first unit; and decoding the encoded sound signal in the second unit.

5. The method of claim 4, wherein the set of encoding and decoding operations further includes:

encoding the echo signal in the second unit; and decoding the encoded echo signal in the first unit.

6. The method of claim 4, wherein the echo signal includes a portion of the sound signal.

7. The method of claim 4, wherein the result of the subtracting is a difference signal, the method further comprising the step of feeding back the difference signal to the adaptive filter.

8. The method of claim 1, wherein step (a) comprises:

performing a first encoding operation on a reference signal that is identical or similar to an encoding operation performed in the first unit, to form a first signal;

performing a first decoding operation on the first signal that is identical or similar to a decoding operation performed in the second unit to form a second signal;

performing a second encoding operation on the second signal that is identical or similar to an encoding operation performed in the second unit to form a third signal; and performing a second decoding operation on the third signal that is identical or similar to a decoding operation performed in the first unit to form the modified reference signal.

9. The method of claim 1, wherein the first unit is a base station, and the second unit is a mobile unit.

10. An acoustic echo canceler for a system having a first unit and a second unit in communication to transmit a sound signal therebetween, comprising:

a plurality of encoders and decoders that receive a reference signal and form a modified reference signal, the plurality of encoders and decoders performing identical or similar operations to those performed by a set of encoders and decoders that operate on the sound signal in the first unit and the second unit to form an echo signal;

an adaptive filter that receives the modified reference signal and forms a replica signal; and a subtractor that subtracts the replica signal from the echo signal received by the first unit.

11. The echo canceler of claim 10, wherein the plurality of encoders and decoders include first and second encoders and first and second decoders.

12. The echo canceler of claim 10, wherein the set of encoders and decoders include: a first encoder in the first unit, a first decoder in the second unit, a second encoder in the second unit, and a second decoder in the first unit.

13. The echo canceler of claim 10, wherein the first unit includes:
   an encoder that receives the sound signal in the first unit;
   a transmitter that transmits the encoded sound signal to the second unit via wireless link;
   a receiver that receives the echo signal from the second unit via wireless link; and
   a decoder that decodes the echo signal.

14. The echo canceler of claim 13, wherein the second unit includes:
   a receiver that receives the encoded sound signal from the first unit;
   a decoder that decodes the received encoded sound signal;
   an encoder that receives a portion of the decoded sound signal and encodes the echo signal; and
   a transmitter that transmits the encoded echo signal to the first unit via a wireless link.

15. The echo canceler of claim 10, wherein the subtractor outputs a difference signal that is fed back to the adaptive filter.

16. The echo canceler of claim 10, wherein the first unit is a base station, and the second unit is a mobile unit.

17. Apparatus for canceling an acoustic echo in a system having a first unit and a second unit in communication with each other, comprising the steps of:
   means for performing a plurality of encoding and decoding operations on a reference signal that is identical or similar to a sound signal, to form a modified reference signal, the plurality of encoding and decoding operations being identical or similar to a set of encoding and decoding operations performed on the sound signal by the first and second units to form an echo signal;
   adaptive filter means for receiving the modified reference signal and outputting a replica signal; and
   subtracting means for subtracting the replica signal from an echo signal received by the first unit.

18. A telephone system, comprising:
   a base station that receives a sound signal, transmits an encoded sound signal, and forms a reference signal that is identical or similar to the sound signal;
   a mobile unit that receives the encoded sound signal from the base station and transmits an encoded echo signal to the base station; and
   an echo canceler, comprising:
      a plurality of encoders and decoders that perform a plurality of encoding and decoding operations on the reference signal to form a modified reference signal, the plurality of encoding and decoding operations being identical or similar to a set of encoding and decoding operations performed on the sound signal by the base station and the mobile unit;
      an adaptive filter that receives the modified reference signal and forms a replica signal; and
      a subtractor that subtracts the replica signal from the echo signal received by the base station.

19. The system of claim 18, wherein the base station includes:
   an encoder that encodes the sound signal;
   a transmitter that transmits the encoded sound signal via wireless link;
   a receiver that receives an encoded echo signal via wireless link; and
   a decoder that decodes the echo signal.

20. The system of claim 18, wherein the mobile unit, includes:
   a receiver that receives the encoded sound signal from the base station;
   a decoder that decodes the encoded sound signal;
   an encoder that receives a reflection of the decoded sound signal and encodes the echo signal; and
   a transmitter that transmits the encoded echo signal to the base station via a wireless link.

* * * * *